United States Patent [19]

Milewski

[11] 3,740,161

[45] June 19, 1973

[54] AUTOMATIC CUTTING TOOL ADJUSTMENT MEANS AND METHOD

[75] Inventor: Victor Milewski, Troy, Mich.

[73] Assignee: The Valeron Corporation, Oak Park, Mich.

[22] Filed: May 18, 1970

[21] Appl. No.: 38,131

[52] U.S. Cl. ............... 408/158, 408/12, 408/168, 408/171
[51] Int. Cl. ....................... B23b 49/00, B23b 47/18
[58] Field of Search .................. 408/12, 13, 8, 10, 408/153, 158, 165, 168, 159, 169, 171, 172, 161, 162; 82/14 D

[56] References Cited
UNITED STATES PATENTS

| 955,180 | 4/1910 | Mason | 408/168 |
| 3,391,585 | 7/1968 | Griswald et al. | 408/158 X |
| 3,459,069 | 8/1969 | Grover | 90/14 X |
| 3,530,745 | 9/1970 | Milewski | 408/158 |
| 2,616,103 | 11/1952 | Stecher | 408/158 |

FOREIGN PATENTS OR APPLICATIONS 923,620   4/1963   Great Britain ...................... 408/12

Primary Examiner—Gil Weidenfeld
Attorney—Farley, Forster and Farley

[57] ABSTRACT

Means and method for adjusting the setting of a cutting tool edge, within close tolerance limits, and automatically, which includes a spindle rod to retract the cutting edge following a work stroke, an abutment stop that the spindle rod bears against during a work stroke, and means for setting the spindle stop free from the axial load normally imposed thereupon.

3 Claims, 4 Drawing Figures

Patented June 19, 1973

INVENTOR
VICTOR MILEWSKI
BY
Farley, Forster & Farley
ATTORNEYS

AUTOMATIC CUTTING TOOL ADJUSTMENT MEANS AND METHOD

BACKGROUND OF THE INVENTION

Today, manufacturers can machine parts to tolerances considered impossible just a few years ago. They are even cutting at high speeds to such close limits that secondary operations such as honing, grinding and lapping are often unnecessary.

The major problem, now, is tool wear.

Although grade improvements are continuously being made in cutting materials, the ability to automatically detect and accurately adjust a tool for cutting edge wear has not been fully possible, heretofore.

The boring tool of U. S. Patent No. 2,998,737 known as the KAMSET boring cutter, made by the Valeron Corporation, has proven to be a big step forward in tool wear adjustment. With such a cutter, all of the cutting edges can be adjusted outward equally, precisely and quickly by means of adjusting a single control cam member. However, manual adjustment, requiring human intervention and possible error, and machine downtime, to make the adjustment, has limited the use of such tools to full advantage.

Another problem, particularly in precision work, is that the cutting tool or its cutting edge must be retractable from the workpiece without leaving any tool marks. This means, in some instances, that the cutting edges must be adjustable both radially inward and outward during each cutting stroke. Although means have been devised to obtain cutting edge retraction, close tolerance adjustments further outward when and as desired, while still providing good back-up support, has provided a difficult problem. This is further compounded by the need for repetitious precision both inward and outward in many cases.

SUMMARY OF THE INVENTION

The present invention relates to cutting tools in general, and more particularly to a machine tool which provides automatic adjustment for cutting tool inserts radially inward or outward, as and when desired, to compensate for insert wear, for undercutting, chamfering, finishing on a retract stroke, or to withdraw the tool from a workpiece without marking the side wall of a finished bore.

A rod extending through the spindle of a machine tool is operated by a double acting hydraulic cylinder to retract the cutting inserts after each cutting stroke. It longitudinally adjusts a cam surfaces member centrally within the cutting tool itself which, in turn, causes one or more cutting inserts on the periphery of the tool to be retracted radially inward.

A precision adjustment stop, axially aligned with the rod, and against which the push rod normally bears, is relieved of all force loads when the hydraulic cylinder moves the rod forward. A small stepper motor, connected to the adjustable stop, is capable of resetting the stop, as and when desired, once the rod load is relieved. Accordingly, extremely precise adjustments of the stop are possible, in relatively small increments, since there is no torque or axial load to adversely affect its movement in one direction or the other.

When the hydraulic cylinder resets the rod back against its stop, the cutting inserts will be reset outwardly in precise accordance with the stop setting that is made. By suitably gauging the workpiece, relative to its required size and utilizing a gauging signal connected in a control circuit with the hydraulic cylinder and the stop adjusting stepper motor, automatic control, free of human error, is accomplished.

DETAILED DESCRIPTION OF THE ILLUSTRATED EMBODIMENT

Figure 1:
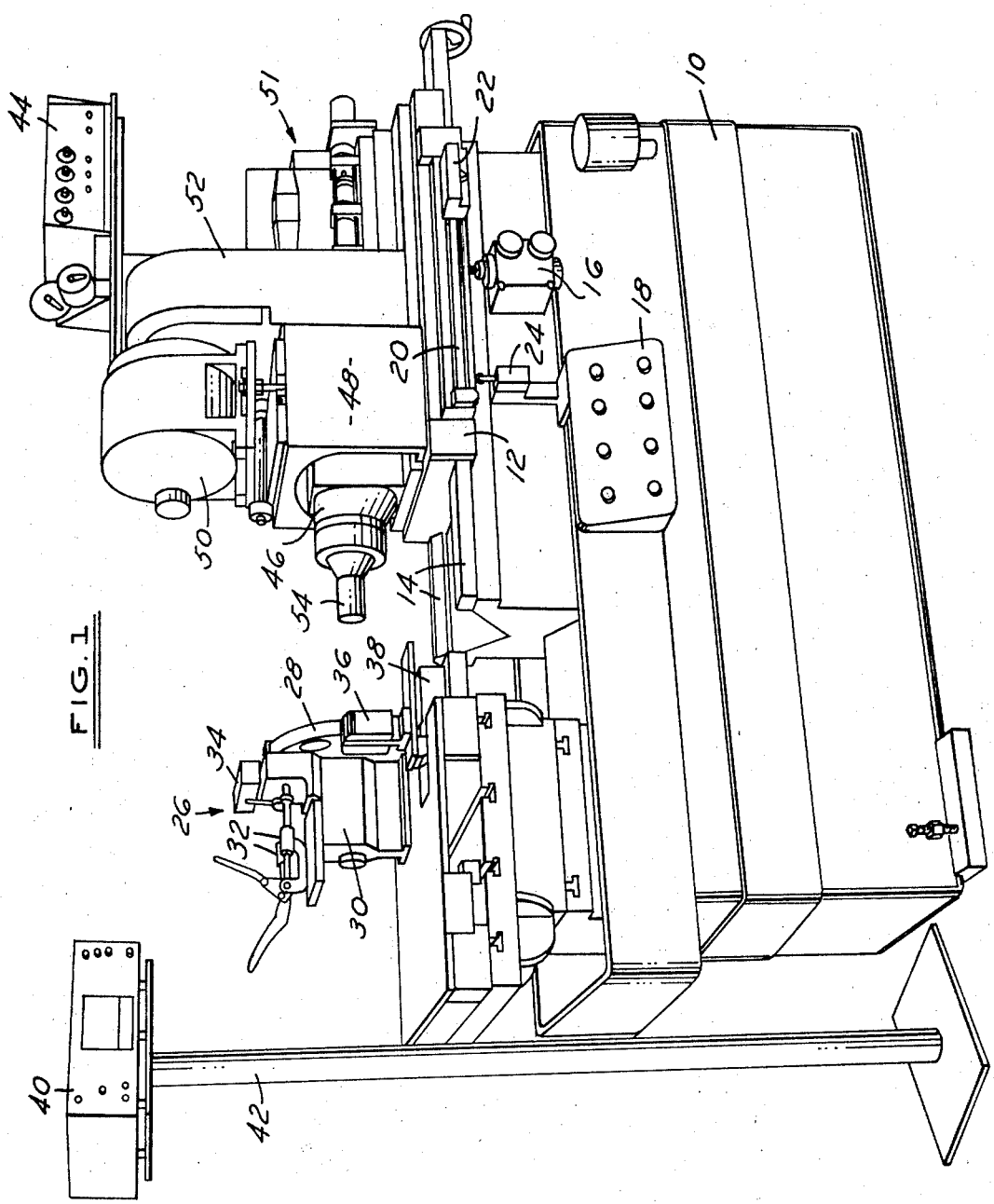
FIG. 1 is a perspective view of the machine tool device of the present invention with the electronic control elements and sizing gauge shown as disposed for use therewith.

The machine tool shown in the first drawing figure is a standard OLOFSSON single slide boring machine with a base 10 and a table 12 that is reciprocal back and forth on the fixed ways 14.

Conventional controls, at 16 and 18, provide for power-on, emergency-off, table feed and certain control functions relative to the particular equipment mounted on it, which will be described later. There is also a table feeding mechanism which causes the table to travel relative to a switch 24 which is located so as to indicate the forward limit intended for travel of the table and the mechanism it carries.

At the other end of the base 10, from the table slide 12, is the work station 26. In this particular instance it is set for a work part 28 that is mounted on a support 30 which includes two gauge pins 32 and a limit switch 34. The gauge pins are to locate the work part for the intended work and one or the other, as shown, is in engagement with a receptive locating hole in the part and will activate the limit switch 34 to evidence a ready-condition for the work to be done.

The gauge head 36, for work part sizing, is shown just behind the workpiece and as partially obscuring it, in the perspective view taken. It is mounted on a hydraulic slide 38 so that it can be moved in and out, relative to the workpiece, and will move in timed relation to the table slide movement, as will be described later.

Other gauging and control devices shown in the first drawing figure include the amplifier 40, on the pole stand 42, and the control console 44, on a like stand so that it is relatively over the table slide and easily accessible.

The machine tool spindle 46, is shrouded in the first drawing figure by a cover member 48 which also serves as a mounting platform for the drive motor 50. The drive belt connection between the motor and spindle is within the belt cover 52, just behind the spindle cover, and the operating mechanism 51 which includes the working embodiment of the present invention rearwardly therefrom.

The operating mechanism for the present invention, the access through the spindle, and the way the boring tool 54 on the end of the spindle is made to perform or function, will best be understood as described with reference to FIG. 2.

Starting from left to right, near the top, there is the gauge head 36, workpiece 28 and tool 54. The gauge is shown with its probes or feelers 56 in a bore 58 in the work piece, that has just been bored by the tool 54, the work stroke for the tool extending between the full line and phantom positions, 54', shown. In this stroke the entire table slide 12 and all the operating mechanism for the tool travels with it during such movement.

The cutting tool 54 includes a bar or nose end 60 extending forward from a flanged end 62 that is fastened to the spindle, by bolt fasteners 64, in a conventional manner. It has one or more cutter cartridges 66, retained by a fastener 68, and each cartridge has a cutting insert 70 of the indexable and throwaway type.

The cutter cartridges 66 include a relief cut 72 that enables them to be deflected and each has an adjustment screw 74 forward thereof that is used to set the cutting inserts, initially. The adjustment screw bears against a cylindrical actuating pin 76 transversely slideable in the cutter body through engagement with a ball 78 having a flat in registration with a carbide tip 80 on the end of a bar 82 that is in an axial bore 84 in the tool body.

The inclined plane surface 86, serves to extend or retract the flexible end of the cutter cartridge 66 by either extending the pin 76, when the bar is pulled back retracting, or by spring back upon relieving the flexing force, when the bar is pushed forward. It will be noted that the ramp angle direction is designed to produce outward deflection which requires the greater axial force on the rod 90 in a tensile or pulling direction with a lighter pushing force required for retraction thereby minimizing the stiffness and size requirements for such actuating rod.

The spindle supported end of tool 54 has its center bore 84 enlarged as necessary to accommodate the larger inner end of bar 82, which is drilled and tapped as at 88 for engagement with rod 90 that extends through the machine tool spindle 46. The rod passes through bearing sleeves 92, 94 in the spindle and has its other end received and held in a fixed coupling bearing 96 which permits the rod 90 to turn with the spindle, and the tool, but is engaged through coupling 122 to operative means on the slide table 12 that do not rotate.

The spindle 46 is conventional design with bearings 98 and 100 in the housing 102 and a drive pulley 104 keyed on the end of the spindle.

The coupling bearing 96, outside the spindle, includes a bearing 106 to allow the rod 90 to turn free while the coupling parts 108 and 110 are held against rotation, as by a stop arm 112 of sufficient length to have engagement with a stop 114 on the table slide 12. It also includes a cross pin 116 to retain a coupling pin 118 engaged in a receptive bore 120 that is just sufficiently oversized, with respect to the coupling pin, to allow some lateral play between them. This enables a radial float for alignment purposes and avoids binding problems in the system.

The coupling 122 includes two semi-cylindrical halves 124 and 126 held together by a fastener 128 and formed to receive a fitting 130, engaged on the coupling pin 118, in one end and a like fitting 132 within the other end for push-pull linear drive through them.

A double acting hydraulic cylinder 134 is next in the operating train for the boring tool. It includes a rod 136 through a housing 138, a piston part 140 on the rod, separate chamber areas 142 and 144 on opposite sides of the piston, and the usual passages 146, 148 and fittings 150, 152 for connection to a four-way control valve 154 (shown schematically). The valve 154 is operated by solenoids 156 and 158 to selectively connect the different chamber areas to the pump 160 or reservoir tank 162 and thereby force and hold the piston rod 136 in one or the other of the two directions available to it.

A stop wall 164 on the back of the hydraulic cylinder 134 serves with a stop nut 166 on the end of the piston rod 136 to limit forward movement of the piston rod. By loosening the set screw 168 and turning the nut down, or back-out, then resetting the set screw, variable limits are easy to obtain.

A stop button 170 on the end of the piston rod 136 engages the abutment end 172 of a micrometer threaded axial adjustment screw 174 in a support 176. A micrometer dial 178 keyed to the threaded member 174 provides accurate axial settings of the abutment end 172 and controls linear translation of movement through to the tool 54, to set the cutter cartridges.

The end of the micrometer threaded screw 174 is slotted, as at 180, to receive a drive key 182 operated by a stepper motor 184. The drive key is backed up by a bellows 186 to allow for manual retraction and engagement, which is no way affects the incremental rotational drive obtained through the control units 44 and 40 shown with electrical connections 188 and 190 respectively therebetween.

In the embodiment that has been described thus far, the stepper motor 184 is intended to adjust the micrometer threaded adjustment screw 174 when the rod 90 and the associated piston rod 136 are in a forward disposed position and not engaged or exerting any axial force load upon it, permitting a relatively small stepper motor to provide a high degree of accuracy for changes that advance or retract the cutting edge. Since there are no force-load variables to contend with, when the adjustments are being made, and the stop load, against the abutment member 174, is always in the same direction removing all lost motion there is every assurance of accurate repeatability. Moreover, the full forward stroke of the actuating rods 136, 90 and 82, to retract the cutting edge at the end of each cutting stroke, and then their movement together in the opposite direction to the same or new setting of the abutment stop, assures sufficient movement of all parts, despite the relatively small total distance they move, to avoid any stacking errors due to frictional forces or otherwise in the operating train.

Figure 3:
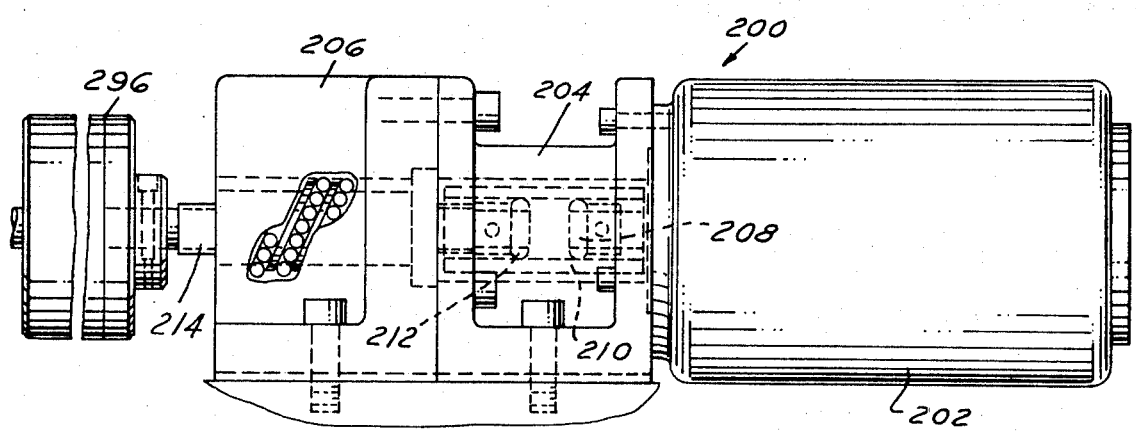
FIG. 3 is a side plan view of another operating mechanism, for use outside the machine tool, partially broken away to show the ball screw thread arrangement provided therewithin.

FIG. 3 shows another type of actuating drive 200 for control of a like tool which includes a stepper motor 202 that is capable of adjusting the rod 90 and ramp 86 under load and without having axial registration physically disengaged.

A hex drive slip-fit connection 204 is provided between the stepper motor 202 and a ball-screw axial motion translator 206. A heavier duty stepper motor is used with a drive connection 208 to the hex sleeve 210, driving a mating shaft 212 in a conventional manner to accommodate axial displacement which is in turn engaged to the ball screw linear actuator 206. The ball screw shaft 214 is connected to coupling 296, corresponding to the coupling 96 in FIG. 2 for translation of its axial movement through to the cutting tool in the same manner as before, but without employing the intermediate hydraulic and other linkage of the first embodiment.

This arrangement is one in which axial loads on the adjustment means even under cutting power are sufficiently low and the mechanical advantage in the use of a ball-screw and slip-fit hex drive are sufficient with a larger stepper motor so as to make the axial load forces well within the capacity of the adjustment system. Furthermore, in practice the control may be programed to retract the cutters after completion of the boring stroke by a predetermined reverse actuation of the stepper motor 202 and to re-establish the cutting diameter, to the same or an adjusted position before the next boring stroke begins so that only the cutter cartridge deflectors resistance is reflected in the axial force required.

Figure 2:
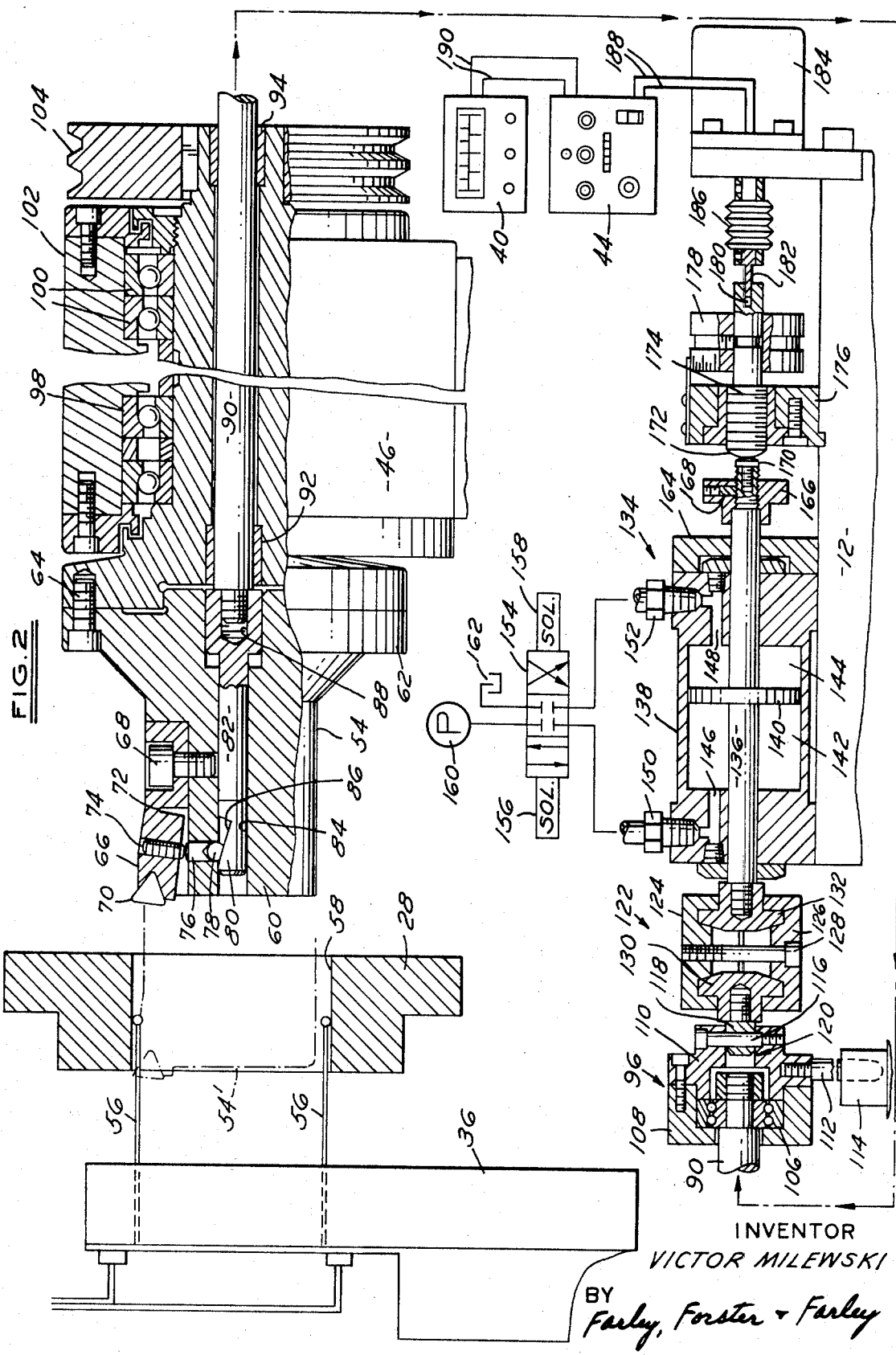
FIG. 2 is a two part cross-sectional view taken longitudinally through the cutting tool and operating machine tool with certain associated parts shown schematically connected thereto.

A number of alternative specific gauging and electrical control systems for determining and effecting required adjustment through the mechanical embodiments of both FIGS. 2 and 3 are possible, which may be classified as manual, semi automatic and automatic. In the simplest manual system, any gauging means for accurately determining the bore diameter of a work piece after a boring operation is completed may be employed with a visual read out and manual adjustment of the micrometer screw 178 as in FIG. 2, such system dispensing with the stepper motor 184 and associated controls.

A semi automatic control including the stepper motor 184 of FIG. 2 or 202 of FIG. 3 may be employed wherein gauging information visually read out from any accurate system may be translated into adjustment through manual actuation of the stepper motor control to bring about adjustment repositioning of the angular position of the stepper motor rotor and micrometer screw 174 in the case of the FIG. 2 embodiment or of the direct positioning of the coupling 296 as in the FIG. 3 embodiment. Push button controls for stepper motor positioning are known in the art.

A fully automatic control may also be employed wherein automatic gauging will produce an energy signal indicating part size deviation from nominal size which may be suitably amplified and employed directly without human intervention to drive the adjustment motor in a compensating direction. A sophisticated form of such control may include proportionality in magnitude as well as direction in the deviation energy signal generated in order to produce a more rapid adjustment response as where tools wear incrementally rather than continuously, and a further degree of sophistication may be employed in using a variable transducer type of null balance gauge having only one nominal point of null balance insensitivity with a corrective energy signal produced on either side of the null balance cross over point as distinguished from a limit range of insensitivity within which no corrective energy signal will be produced.

Since controls of the type mentioned as well as others are known in the art, they are not disclosed herein in detail and will be sufficiently understood from the following description with reference to the schematic disclosure of the drawings.

Figure 4:
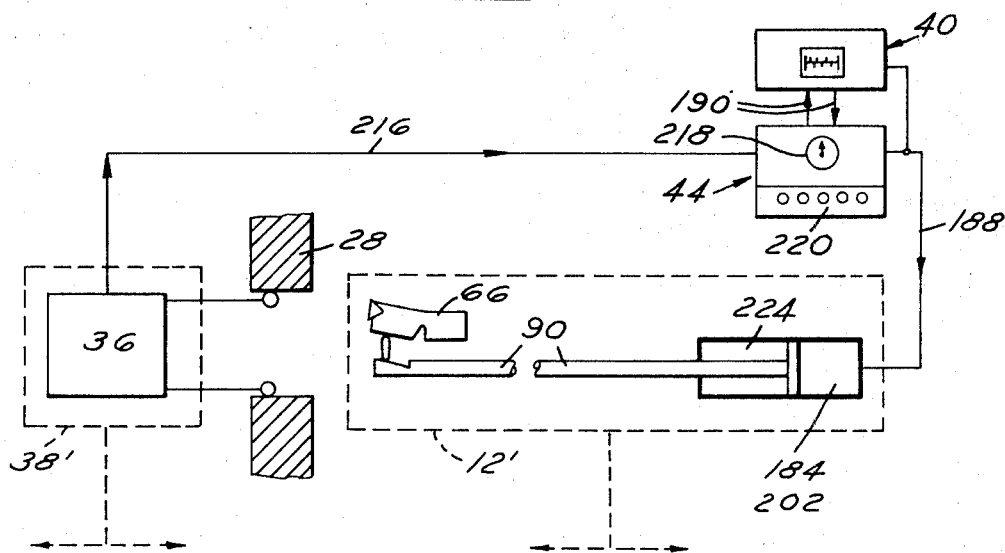
FIG. 4 is an electro-mechanical schematic diagram of the various operating controls and mechanisms for the dislosed machine tool.

FIG. 4 is a schematic illustration applicable in principal to the embodiments of both FIG. 2 and 3.

The gauge head 36, measures hole size differentially and produces an electrical energy signal varying in direction and magnitude with deviation from exact nominal size, as by coupling the probe elements with the core and coil respectively of a variable transducer wired to provide a well balanced voltage output where the probe differential spacing corresponds to said nominal size. The dotted outline 38' represent the hydraulically actuated slide mechanism for moving the gauging head in and out of gauging relation to the work part 28 as shown in FIG. 1 which transmits an electrical impulse signal through a connection 216 to the control console 44 which has a voltage actuated dial indicator 218 visually displaying the extent and direction of hole size deviation, as well push buttons 220 for manual control of stepping motor 184.

The amplifier 40 and its connections 190 for the gauge energy signal, show means for automatic control.

The connection 188 to the motor 184, or 202, as the case may be, is such as will cause the incremental adjustment desired within the adjustment means, identified as 224. The push-rod connection 90 is shown along with a cutter cartridge 66 in a dotted outline representation of the slide table and hence identified as 12'.

Automatic operation includes retraction of the probe device 36 from the work as the slide table advances with the tool 54. The push-rod 90 is actuated automatically, at the end of the table travel, as signalled by table switch 24 for example, to move the rod outwardly and cause the cutting insert to be retracted so that it will not mark surface while the tool is being retracted from the work. As the tool is retracted from the work the probe 36 moves into the work to gauge hole size.

After the abutment stop 174 is reset, in the FIG. 2 embodiment, during the rearward travel of the slide table 12 or at any other suitable time, the actuating rod 90 may be pulled back into engagement with the stops and the tool is ready for the next work part. With the other adjustment means, of FIG. 3, the adjustment may be obtained at any time.

The tool disclosed can automatically maintain outward or inward adjustment of a cutting edge in any increment desired, with extreme accuracy and repeatability. Adjustments can be made with the spindle rotating or stationary. There is preferable about a 0.005 retract after each cut, to avoid drag marks when the tool is withdrawn from the work, and to permit resetting to a new size when required.

Single point tools are recommended for hole sizes of 1.500 diameter and smaller but larger sizes can use several cutting inserts. On multiple spindle operations, all heads can be automatically adjusted individually or together in any sequence. The disclosed operating mechanism can be used on boring machines with conventional or hydrostatic spindles, also on close tolerance turning or other operations where a high degree of accuracy is important.

Examples of work where this type of tooling is ideally suited for use includes, through boring on an oil pump housing, automotive connecting rods and caps where size must be held to extremely close limits and maintained over very long runs and where interrupted cuts due to mismatching or differences in material may be involved. Forged steel steering knuckles are another critical job. Roughing and finishing passes during forward and retract strokes are another use. Facing of crankshaft journals with tools mounted on both sides of the work so that the shoulder of one journal is finished on one side and the machine shuttles into a second position for the alternate tool to finish the other shoulder, all under close size control, are also possible.

Two automatic size control units, cutting together can be used to hold flange thickness, as with a disc brake flange where the part is rotated and the tools move relative to it and across opposite side faces.

These and other uses are all within the scope envisioned for tools within the protection of the following claims:

I claim:

1. Size control means for a machine tool, comprising; a cutting tool body mounted on said machine tool, radially movable cutter means mounted on said cutting tool body and resiliently biased to a retracted position, axially reciprocable means extending within said cutting tool body in engagement with said cutter means and adapted to actuate said cutter means, actuating means for axially moving said reciprocable means and maintaining said reciprocable means in position after movement at a desired position, and positioning means associated with said actuating means including means to control axial movement of said reciprocable means for retraction of said cutter means and precise increment adjusting means to control said axial movement of said reciprocable means for extension of said cutter means to precisely determine the final outermost cutting position of said cutter means.

2. Size control means for a machine tool, comprising; a cutting tool body mounted on said machine tool, radially movable cutter means mounted on said cutting tool body and resiliently biased to a retraction position, axially reciprocable means extending within said cutting tool body in engagement with said cutter means and adapted to actuate said cutter means, actuating means for axially moving said reciprocal means and maintaining said reciprocal in position after movement at a desired position, positioning means associated with said actuating means including control means to control axial movement of said reciprocal means for retraction of said cutter means and for precise increment adjustment to control axial movement of said reciprocal means for extension of said cutter means to precisely determine the final outermost cutting position of said cutter means, and said actuating means and positioning means include a ball screw threaded adapter to actuate said reciprocal means and a stepper motor in driving engagement with said ball screw threaded adapter.

3. The size control means of claim 2 wherein said ball screw threaded adapter is rotationally reversible.

* * * * *